United States Patent
Mukai et al.

(10) Patent No.: US 9,671,544 B2
(45) Date of Patent: Jun. 6, 2017

(54) RETARDATION FILM, AND OPTICAL COMPENSATION LAYER, OPTICAL COMPENSATION POLARIZING PLATE, LIQUID CRYSTAL DISPLAY DEVICE AND ORGANIC EL DISPLAY DEVICE EACH USING SAID RETARDATION FILM

(71) Applicant: KANEKA CORPORATION, Osaka-shi (JP)

(72) Inventors: Ryutaro Mukai, Settsu (JP); Tomohiro Abo, Otsu (JP)

(73) Assignee: KANEKA CORPORATION, Osaka-shi (JP)

( * ) Notice: Subject to any disclaimer, the term of this patent is extended or adjusted under 35 U.S.C. 154(b) by 0 days.

(21) Appl. No.: 15/030,683

(22) PCT Filed: Oct. 20, 2014

(86) PCT No.: PCT/JP2014/077823
§ 371 (c)(1),
(2) Date: Apr. 20, 2016

(87) PCT Pub. No.: WO2015/060241
PCT Pub. Date: Apr. 30, 2015

(65) Prior Publication Data
US 2016/0274286 A1 Sep. 22, 2016

(30) Foreign Application Priority Data
Oct. 23, 2013 (JP) .................. 2013-220070

(51) Int. Cl.
| | |
|---|---|
| *G02F 1/13363* | (2006.01) |
| *G02B 5/30* | (2006.01) |
| *B29C 55/06* | (2006.01) |
| *C08J 5/18* | (2006.01) |
| *B29C 55/04* | (2006.01) |
| *B29D 11/00* | (2006.01) |
| *G02B 1/111* | (2015.01) |
| *G02F 1/1335* | (2006.01) |
| *B29K 1/00* | (2006.01) |
| *B29L 11/00* | (2006.01) |

(52) U.S. Cl.
CPC ............ *G02B 5/3083* (2013.01); *B29C 55/04* (2013.01); *B29C 55/06* (2013.01); *B29D 11/00788* (2013.01); *C08J 5/18* (2013.01); *G02B 1/111* (2013.01); *G02B 5/305* (2013.01); *G02F 1/13363* (2013.01); *G02F 1/133528* (2013.01); *B29K 2001/08* (2013.01); *B29L 2011/00* (2013.01); *G02F 2001/133541* (2013.01); *G02F 2001/133635* (2013.01); *G02F 2202/40* (2013.01); *G02F 2413/13* (2013.01); *Y10T 428/105* (2015.01)

(58) Field of Classification Search
CPC .......... G02F 1/13363; G02F 1/133528; G02F 2202/40; G02F 2413/13; G02B 1/111; G02B 5/305; G02B 5/3083; Y10T 428/105; B29K 2001/08
See application file for complete search history.

(56) References Cited

U.S. PATENT DOCUMENTS

| | | | |
|---|---|---|---|
| 2008/0107829 A1 | 5/2008 | Oya et al. | |
| 2009/0273837 A1 | 11/2009 | Kawai et al. | |

FOREIGN PATENT DOCUMENTS

| | | |
|---|---|---|
| CN | 101147086 B | 2/2011 |
| JP | 2006-282885 A | 10/2006 |
| JP | 2007-121351 A | 5/2007 |
| JP | 2007-332191 A | 12/2007 |
| JP | 2009-132764 A | 6/2009 |
| JP | 2009-221290 A | 10/2009 |
| JP | 2011-112842 A | 6/2011 |
| JP | 4892313 B2 | 12/2011 |

OTHER PUBLICATIONS

International Search Report issued Dec. 16, 2014 in PCT/JP2014/077823 (with English language translation).
English translation of International Preliminary Report on Patentability and Written Opinion issued May 6, 2016 in PCT/JP2014/077823.

*Primary Examiner* — Sophie Hon
(74) *Attorney, Agent, or Firm* — Oblon, McClelland, Maier & Neustadt, L.L.P.

(57) ABSTRACT

The present invention achieves a phase difference film that is excellent in wavelength dispersion property, in-plane retardation, and film thickness, by using a polymeric material (i) which is composed of at least one type of cellulose derivative having a specific alkoxyl group substitution degree $D_1$ and a specific 2-naphthoyl group substitution degree $D_2$ and (ii) which has a specific total 2-naphthoyl group substitution degree $D_3$.

20 Claims, No Drawings

RETARDATION FILM, AND OPTICAL COMPENSATION LAYER, OPTICAL COMPENSATION POLARIZING PLATE, LIQUID CRYSTAL DISPLAY DEVICE AND ORGANIC EL DISPLAY DEVICE EACH USING SAID RETARDATION FILM

TECHNICAL FIELD

The present invention relates to a phase difference film which is applicable to image display devices such as a liquid crystal display device and an organic EL display device. More specifically, the present invention relates to a phase difference film having an in-plane retardation that becomes greater toward a longer wavelength side.

BACKGROUND ART

In order to improve display performance of image display devices such as a liquid crystal display device and an organic EL display device, various types of phase difference films have been utilized. Among them, a phase difference film having an in-plane retardation that becomes greater toward a longer wavelength side (hereinafter, referred to as a "reverse wavelength dispersion film") can be used as an antireflection layer for a reflective-type liquid crystal display device a touch panel and an organic EL display device.

A reverse wavelength dispersion film to be used as an antireflection layer is preferably such that (i) a phase difference is approximately one-fourth of a measurement wavelength $\lambda$, and (ii) a ratio Re(450)/Re(550) between an in-plane retardation at 450 nm and an in-plane retardation at 550 nm is close to 0.81. Further, in order to achieve a thickness reduction of display devices, a small film thickness of approximately 20 µm to 50 µm is demanded of a reverse wavelength dispersion film to be used. Thus, various types of phase difference films have been developed to respond to such a demand for the above described properties.

Patent Literature 1 discloses a reverse wavelength dispersion film that is composed of cellulose acylate and ethyl cellulose. The phase difference film disclosed in Patent Literature 1 has an in-plane retardation of approximately $\lambda/4$ and is suited for an intended use as an antireflection layer. However, the reverse wavelength dispersion film disclosed in Patent Literature 1 faces the following trade-offs. That is, an improvement in reverse wavelength dispersion property causes an increase in film thickness. Conversely, a reduction in film thickness causes a reverse wavelength dispersion property Re(450)/Re(550) approaching 1. Thus, the reverse wavelength dispersion film disclosed in Patent Literature 1 requires a further improvement to satisfy both a film thickness and a reverse wavelength dispersion property.

Patent Literature 2 discloses a reverse wavelength dispersion film that is composed of cellulose acylate and ethyl cellulose. In order to use the phase difference film disclosed in Patent Literature 2 as an antireflection layer, it is necessary to adjust an in-plane retardation of the phase difference film. Since an in-plane retardation is proportional to a film thickness, it is possible to achieve an in-plane retardation of approximately $\lambda/4$ by increasing the film thickness. However, increasing the in-plane retardation by adjusting the film thickness increases the film thickness. Therefore, the reverse wavelength dispersion film of Patent Literature 2 requires a further improvement.

Patent Literature 3 discloses a reverse wavelength dispersion film that is composed of cellulose acylate and ethyl cellulose. The phase difference film disclosed in Patent Literature 3 is higher in phase difference exhibition property than those disclosed in Patent Literatures 1 and 2. Thus, the phase difference film of Patent Literature 3 is capable of, while having a small film thickness, exhibiting the same in-plane retardation as those of the phase difference films disclosed in Patent Literatures 1 and 2. However, the phase difference film of Patent Literature 3 still has a film thickness of approximately 60 µm to 70 µm, and thus requires a further improvement.

Patent Literature 4 discloses a cellulose derivative that has, as substituents, various types of aromatic acylates and aliphatic acylates that differ from each other in maximum absorption wavelength and molar absorption coefficient. The phase difference film disclosed in Patent Literature 4 is capable of exhibiting an intended reverse wavelength dispersion property, but has a considerably low phase difference exhibition property. Thus, in order to achieve an intended in-plane retardation, it is necessary to increase a film thickness of the phase difference film to approximately 80 µm. Therefore, the phase difference film of Patent Literature 4 requires a further improvement.

Patent Literature 5 discloses a cellulose derivative film having a great film thickness direction retardation (Rth). A material of this film includes aromatically esterified cellulose ether. However, Patent Literature 5 does not employ a processing technique such as heat stretching, and Patent Literature 5 makes no mention of the in-plane retardation and the reverse wavelength dispersion property that are essential properties for the present invention. The film disclosed in Patent Literature 5 is a VA-type liquid crystal compensation sheet for which an unstretched film produced by solution casting is directly used, and has properties different from the properties required of the present invention. Thus, the film disclosed in Patent Literature 5 has a film thickness that is approximately twice larger than that of the present invention.

CITATION LIST

Patent Literature

[Patent Literature 1]
  Japanese Patent Application Publication Tokukai No. 2007-121351 (Publication Date: May 17, 2007)
[Patent Literature 2]
  Japanese Patent Application Publication Tokukai No. 2006-282885 (Publication Date: Oct. 19, 2006)
[Patent Literature 3]
  Japanese Patent Application Publication Tokukai No. 2011-112842 (Publication Date: Jun. 9, 2011)
[Patent Literature 4]
  Japanese Patent No. 4892313 (Publication Date: Apr. 24, 2008)
[Patent Literature 5]
  Japanese Patent Application Publication Tokukai No. 2009-132764 (Publication Date: Jun. 18, 2009)

SUMMARY OF INVENTION

Technical Problem

The present invention is attained in view of the foregoing conventional problem. An object of the present invention is to provide a reverse wavelength dispersion film that has an excellent wavelength dispersion property, an in-plane retardation of approximately λ/4, and a film thickness as small as 20 μm to 50 μm.

Solution to Problem

<1>

A phase difference film including a polymeric material composed of at least one type of cellulose derivative having a polymerization unit represented by general formula (1):

[Chem. 1]

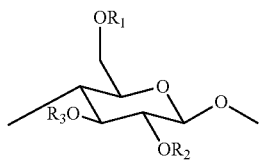

General formula (1)

where each of $R_1$, $R_2$, and $R_3$ independently contains an aliphatic group, an unsaturated aliphatic group, or a 2-naphthoyl group, the phase difference film having (a) an in-plane retardation Re(550) of not less than 130 nm and not more than 160 nm, (b) a reverse wavelength dispersion property Re(450)/Re(550) of not less than 0.80 and not more than 0.86, and (c) a film thickness of not less than 20 μm and not more than 50 μm, wherein: in the at least one type of cellulose derivative, a sum of substitution degrees $D_1$ of alkoxyl groups each containing an aliphatic group or an unsaturated aliphatic group is not less than 2.00 and not more than 2.70; in the at least one type of cellulose derivative, a substitution degree $D_2$ of 2-naphthoyl groups is not less than 0.30 and not more than 1.00; in the polymeric material, a total substitution degree $D_3$ of 2-naphthoyl groups is not less than 0.41 and not more than 0.50; and the substitution degrees $D_1$ and $D_2$ satisfy $D_1+D_2 \leq 3.0$.

<2>

The phase difference film described in <1>, wherein in the at least one type of cellulose derivative, each of the alkoxyl groups in the general formula (1) has an aliphatic alkyl group.

<3>

The phase difference film described in <2>, wherein in the at least one type of cellulose derivative, each of the alkoxyl groups in the general formula (1) has an ethyl group.

<4>

The phase difference film described in any one of <1> through <3>, wherein the phase difference film is obtained by stretching, at a stretching ratio of not less than 20% and not more than 200%, a base film including the polymeric material.

<5>

The phase difference film described in <4>, wherein the base film is stretched at a temperature falling within a range from (Tg−10)° C. to (Tg+30)° C. with respect to a glass transition temperature Tg of the base film.

<6>

A circularly polarizing plate comprising at least one phase difference film described in any one of <1> through <5>.

<7>

An image display device comprising a circularly polarizing plate described in <6>.

<8>

A phase difference film including polymeric material composed of at least one type of cellulose derivative having a polymerization unit represented by general formula (1):

[Chem. 2]

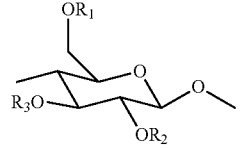

General formula (1)

where each of $R_1$, $R_2$ and $R_3$ independently contains an ethyl group or a 2-naphthoyl group, the phase difference film having (a) an in-plane retardation Re(550) of not less than 130 nm and not more than 160 nm, (b) a reverse wavelength dispersion property Re(450)/Re(550) of not less than 0.80 and not more than 0.89, (c) a film thickness of not less than 20 μm and not more than 50 μm, and (d) a haze of not more than 2.00%, wherein: in the at least one type of cellulose derivative, a sum of substitution degrees $D_1$ of ethyl groups is not less than 2.00 and not more than 2.70; in the at least one type of cellulose derivative, a substitution degree $D_2$ of 2-naphthoyl groups is not less than 0.30 and not more than 1.00; in the polymeric material, a total substitution degree $D_3$ of 2-naphthoyl groups is not less than 0.40 and not more than 0.50; and the substitution degrees $D_1$ and $D_2$ satisfy $D_1+D_2 \leq 3.0$.

<9>

The phase difference film described in <8>, wherein the phase difference film is obtained by stretching, at a temperature falling within a range from 150° C. to 160° C., a base film including the polymeric material.

<10>

The phase difference film described in <9>, wherein the base film is stretched at a stretching ratio of not less than 20% and not more than 60%.

<11>

A circularly polarizing plate comprising at least one phase difference film described in any one of <8> through <10>.

<12>

An image display device comprising a circularly polarizing plate described in <11>.

<13>

A method for producing a phase difference film described in <8>, the method comprising the step of stretching, at a temperature falling within a range from 150° C. to 160° C., a base film including the polymeric material.

<14>

The method described in <13>, wherein in the step of stretching the base film which contains the polymeric material, the base film is stretched at a stretching ratio of not less than 20% and not more than 60%.

Advantageous Effects of Invention

The present invention makes it possible to produce a reverse wavelength dispersion film that has an excellent reverse wavelength dispersion property, an in-plane retardation of approximately λ/4, and a small film thickness of 20 μm to 50 μm.

DESCRIPTION OF EMBODIMENTS

The following description will discuss an embodiment of the present invention. Note, however, that the present invention is not limited thereto. As used herein, a numerical range expressed as "A to B" means "not less than A and not more than B".

A phase difference film according to an embodiment of the present invention is a phase difference film including a polymeric material composed of at least one type of cellulose derivative having a polymerization unit represented by general formula (1):

[Chem. 3]

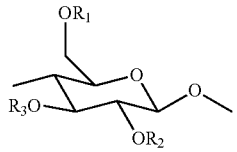

General formula (1)

where each of $R_1$, $R_2$, and $R_3$ independently contains an aliphatic group, an unsaturated aliphatic group, or a 2-naphthoyl group, the phase difference film having (a) an in-plane retardation Re(550) of not less than 130 nm and not more than 160 nm, (b) a reverse wavelength dispersion property Re(450)/Re(550) of not less than 0.80 and not more than 0.86, and (c) a film thickness of not less than 20 μm and not more than 50 μm, wherein: in the at least one type of cellulose derivative, a sum of substitution degrees $D_1$ of alkoxyl groups each containing an aliphatic group or an unsaturated aliphatic group is not less than 2.00 and not more than 2.70; in the at least one type of cellulose derivative, a substitution degree $D_2$ of 2-naphthoyl groups is not less than 0.30 and not more than 1.00; in the polymeric material, a total substitution degree $D_3$ of 2-naphthoyl groups is not less than 0.41 and not more than 0.50; and the substitution degrees $D_1$ and $D_2$ satisfy $D_1+D_2 \leq 3.0$.

Note that the polymeric material can be composed of one type or two or more types of cellulose derivatives.

For example, the phase difference film of the present invention can be a phase difference film including a polymeric material composed of a combination of two or more types of cellulose derivatives each having a polymerization unit represented by the general formula (1), the phase difference film having (a) an in-plane retardation Re(550) of not less than 130 nm and not more than 160 nm, (b) a reverse wavelength dispersion property Re(450)/Re(550) of not less than 0.80 and not more than 0.86, and (c) a film thickness of not less than 20 μm and not more than 50 μm, wherein: in the two or more types cellulose derivatives, a sum of substitution degrees $D_1$ of alkoxyl groups each containing an aliphatic group or an unsaturated aliphatic group is not less than 2.00 and not more than 2.70; in the two or more types cellulose derivatives, a substitution degree $D_2$ of 2-naphthoyl groups is not less than 0.30 and not more than 1.00; in the polymeric material, a total substitution degree $D_3$ of 2-naphthoyl groups is not less than 0.41 and not more than 0.50; and the substitution degrees $D_1$ and $D_2$ satisfy $D_1+D_2 \leq 3.0$.

The phase difference film according to another embodiment of the present invention is a phase difference film including a polymeric material composed of at least one type of cellulose derivative having a polymerization unit represented by general formula (1):

[Chem. 4]

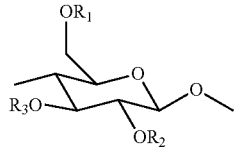

General formula (1)

where each of $R_1$, $R_2$, and $R_3$ independently contains an ethyl group or a 2-naphthoyl group, the phase difference film having (a) an in-plane retardation Re(550) of not less than 130 nm and not more than 160 nm, (b) a reverse wavelength dispersion property Re(450)/Re(550) of not less than 0.80 and not more than 0.89, (c) a film thickness of not less than 20 μm and not more than 50 μm, and (d) a haze of not more than 2.00%, wherein: in the at least one type of cellulose derivative, a sum of substitution degrees $D_1$ of ethyl groups is not less than 2.00 and not more than 2.70; in the at least one type of cellulose derivative, a substitution degree $D_2$ of 2-naphthoyl groups is not less than 0.30 and not more than 1.00; in the polymeric material, a total substitution degree $D_3$ of 2-naphthoyl groups is not less than 0.40 and not more than 0.50; and the substitution degrees $D_1$ and $D_2$ satisfy $D_1+D_2 \leq 3.0$.

Note that the polymeric material can be composed of one type or two or more types of cellulose derivatives.

For example, the phase difference film of the present invention can be a phase difference film including a polymeric material composed of two or more types of cellulose derivatives each having a polymerization unit represented by the general formula (1), the phase difference film having (a) an in-plane retardation Re(550) of not less than 130 nm and not more than 160 nm, (b) a reverse wavelength dispersion property Re(450)/Re(550) of not less than 0.80 and not more than 0.89, (c) a film thickness of not less than 20 μm and not more than 50 μm, and (d) a haze of not more than 2.00%, wherein: in the two or more types of cellulose derivatives, a sum of substitution degrees $D_1$ of ethyl groups is not less than 2.00 and not more than 2.70; in the two or more types of cellulose derivatives, a substitution degree $D_2$ of 2-naphthoyl groups is not less than 0.30 and not more than 1.00; in the polymeric material, a total substitution degree $D_3$ of 2-naphthoyl groups is not less than 0.40 and not more than 0.50; and the substitution degrees $D_1$ and $D_2$ satisfy $D_1+D_2 \leq 3.0$.

The following description will discuss each component.

(A) Cellulose Derivatives

As shown in the general formula (1), the above-described cellulose derivative is a compound in which three hydroxyl groups of a β-glucose skeleton, which is a monomer that constitutes cellulose, are converted into alcoholic derivatives ($OR_1$, $OR_2$, $OR_3$) by any of known conversion reaction methods.

Effective selection of the cellulose derivative allows imparting high transparency and optical properties (e.g., in-plane retardation exhibition property and reverse wavelength dispersibility) to both a base film and a stretched film produced by stretching the base film.

The cellulose derivative can be an aliphatic ester, an aromatic ester, alkoxyl, amide, urethane, carbonate, carbamate, or the like, depending on what forms the substituents take. Various substituents can be mixed in each molecule of the cellulose derivative. From the viewpoint of achieving both an excellent in-plane retardation and an excellent reverse wavelength dispersibility of the stretched film, (i) each of $R_1$ through $R_3$ indicated in the general formula (1) is preferably an aliphatic alkyl group or a 2-naphthoyl group, and the cellulose derivative preferably has a skeleton in which an aliphatic alkyl group and a 2-naphthoyl group are contained in each molecule. This is because the cellulose derivative having a skeleton in which an aliphatic alkyl group is contained allows an improvement in phase difference exhibition property of the stretched film.

The aliphatic alkyl group is not particularly limited. However, from the viewpoint of imparting solubility in an organic solution to the cellulose derivative, it is particularly preferable that the aliphatic alkyl group have an ethyl group.

The 2-naphthoyl group exerts an excellent effect of exhibiting the reverse wavelength dispersibility. There are two naphthoyl groups, namely a 1-naphthoyl group and the 2-naphthoyl group, which are different in what position on a naphthalene ring is substituted with a carbonyl group. The 2-naphthoyl group exhibits a remarkable reverse wavelength dispersibility. Note that the 2-naphthoyl group can have a substituent on the naphthalene ring. Such a substituent is not particularly limited, and can be an alkoxyl group, an ester group, an amide group, a nitrile group, halogen, or the like.

The above-described cellulose derivative is thermally stretched so that it can achieve an excellent in-plane retardation and an excellent reverse wavelength dispersibility, between which other cellulose derivatives usually face a trade-off. Thus, the cellulose derivative allows for a significant reduction in film thickness while maintaining an excellent reverse wavelength dispersibility and an excellent in-plane retardation. Further, the cellulose derivative is not limited to one type of cellulose derivative, and can be a combination of two or more types of cellulose derivatives, provided that such derivatives are compatible to each other.

The cellulose derivative which is to be contained in a phase difference film and which is represented by the general formula (1) is also referred to herein as a "polymeric material". The "polymeric material" can be composed of one type of cellulose derivative or a combination of two or more types of cellulose derivatives. The phase difference film of the present invention can contain constituents other than the polymeric material.

(B) Conversion Reaction of Cellulose Derivatives

The conversion reaction for producing the cellulose derivative can be made by a known synthesis method. An example synthesis method will be discussed below, but the known synthesis method is not limited thereto. The easiest synthesis method is as follows: Commercially available cellulose ether (e.g., ethyl cellulose) and aromatic acyl chloride (e.g., 2-naphthoyl chloride) coexisting with each other in the presence of pyridine are heated to obtain a reactant, and the reactant is then cleaned with water and an organic solution. As a result, an intended cellulose derivative is obtainable in which each hydroxyl group of ethyl cellulose is aromatically esterified.

(C) Substitution Degree of Cellulose

Substitution degree D (specifically, $D_1$ through $D_3$) represents an average degree of substitution of three hydroxyl groups binding to the 2-position, 3-position, 6-position of each cellulose molecule, and is expressed as a positive number (3 at the maximum). Note that substitution degrees of the three hydroxyl groups may be substantially identical to each other. Alternatively, a substitution degree of one of the three hydroxyl groups may be higher than substitution degrees of the other two hydroxyl groups.

The substitution degree $D_1$ (alkoxyl group substitution degree $D_1$) represents an average degree of alkoxylation of the three hydroxyl groups binding to the 2-, 3-, 6-positions of each cellulose molecule in at least one type of cellulose derivative contained in the phase difference film, and is expressed as a positive number (3 at the maximum). Note that substitution degrees of the three hydroxyl groups may be substantially identical to each other. Alternatively, a substitution degree of one of the three hydroxyl groups may be higher than substitution degrees of the other two hydroxyl groups.

The substitution degree $D_2$ (2-naphthoyl group substitution degree $D_2$) represents an average degree of aromatic acylation of the three hydroxyl groups binding to the 2-, 3-, 6-positions of each cellulose molecule in at least one type of cellulose derivative contained in the phase difference film, and is expressed as an integral number (3 at the maximum). Note that substitution degrees of the three hydroxyl groups may be substantially identical to each other. Alternatively, a substitution degree of one of the three hydroxyl groups may be higher than substitution degrees of the other two hydroxyl groups.

The total substitution degree $D_3$ (total 2-naphthoyl group substitution degree $D_3$) represents an average degree of aromatic acylation of the three hydroxyl groups binding to the 2-, 3-, 6-positions of each cellulose molecule in the polymeric material contained in the phase difference film, and is expressed as a positive number (3 at the maximum). For example, in a case where the polymeric material is composed of one type of cellulose derivative, the total substitution degree $D_3$ represents an average degree of aromatic acylation of the three hydroxyl groups binding to the 2-, 3-, 6-positions of each cellulose molecule in the one type of cellulose derivative, and is expressed as an integral number (3 at the maximum). Meanwhile, in a case where the polymeric material is composed of a combination of two or more types of cellulose derivatives, the total substitution degree $D_3$ represents an average degree of aromatic acylation of the three hydroxyl groups binding to the 2-, 3-, 6-positions of each cellulose molecule in the combination of the two or more types of cellulose derivatives, and is expressed as an integral number (3 at the maximum).

A value of the substitution degree D can be calculated by a known method. For example, in a case where the alkoxyl group is an ethoxy group, the substitution degree $D_1$ of the alkoxyl group can be quantitatively determined by the method disclosed in "Cellulose Communications 6, 73-79 (1999)" (nuclear magnetic resonance spectroscopic method: NMR). Note that the above Non-Patent Literature will be incorporated by reference herein.

As described above, the substitution degrees $D_1$ and $D_2$ are intended to be the degrees of substitution in individual types of cellulose derivatives that constitute the polymeric material. Meanwhile, the total substitution degree $D_3$ is intended to be the degree of substitution in the polymeric material as a whole. Specifically, in a case where the polymeric material is composed of one type of cellulose derivative, a value of the substitution degree $D_3$ of the polymeric material will be equal to that of the substitution degree $D_2$ of the one type of cellulose derivative. Meanwhile, in a case where the polymeric material is composed of a combination of two or more types of cellulose derivatives, a value of the substitution degree $D_3$ of the polymeric material will be determined based on values of the substitution degrees $D_2$ of the two or more types of cellulose derivatives.

The following description will further discuss each of the total substitution degree $D_3$, the substitution degree $D_1$, and the substitution degree $D_2$ in detail.

First, the total substitution degree $D_3$ will be discussed below.

The amount of a 2-naphthoyl group to be introduced into the polymeric material (i.e., the total substitution degree $D_3$) needs to be an optimum amount. The optimum amount varies depending on what aromatic acyl group is to be introduced. In a case where the 2-naphthoyl group, which is a constituent element of the present invention, is to be introduced, the total substitution degree $D_3$ can be not less than 0.40 and not more than 0.50. In order to achieve an optimum reverse wavelength dispersion property, the total substitution degree $D_3$ is preferably not less than 0.41 and not more than 0.50, more preferably not less than 0.42 and not more than 0.50, still more preferably not less than 0.42 and not more than 0.48, still further more preferably not less than 0.44 and not more than 0.48, most preferably not less than 0.45 and not more than 0.47.

A total substitution degree $D_3$ of less than 0.40 leads to an excessively low reverse wavelength dispersion exhibition property. Meanwhile, a total substitution degree $D_3$ of more than 0.50 leads to an excessively high reverse wavelength dispersion exhibition property or a cellulose derivative having a negative birefringence (which will be described later). Such total substitution degrees $D_3$ are not preferable since they provide practically unsatisfactory properties.

Next, the substitution degree $D_1$ will be discussed below.

The cellulose ether has solubility to a solvent and a phase difference exhibition property, both of which greatly vary depending on its alkoxyl group substitution degree $D_1$. However, since introduction reaction of an aromatic acyl group for exhibiting the reverse wavelength dispersibility requires a proper amount of unsubstituted hydroxyl groups, the cellulose ether preferably has a moderate alkoxyl group substitution degree ($D_1$=2.00 to 2.70).

An alkoxyl group substitution degree $D_1$ of less than 2.00 leads to (i) a limitation of choice of solvents in which an intended cellulose derivative is to be dissolved and (ii) a poor film strength. Meanwhile, an alkoxyl group substitution degree $D_1$ in excess of 2.70 leads to (i) degradation in reverse wavelength dispersibility due to a decrease in amount of an aromatic acyl group to be introduced, and (ii) degradation in film transparency during a film forming step and a heat stretching step. Thus, such alkoxyl group substitution degrees $D_1$ are not preferable. Therefore, the alkoxyl group substitution degree $D_1$ is not less than 2.00 and not more than 2.70, preferably not less than 2.20 and not more than 2.70, more preferably not less than 2.20 and not more than 2.65, still more preferably not less than 2.30 and not more than 2.65, still further more preferably not less than 2.30 and not more than 2.60.

In the present invention, 2-naphthoyl groups are introduced into OH groups remaining in a cellulose ether skeleton having an alkoxyl group substitution degree $D_1$ that falls within the above-described range. This allows a main-chain component (cellulose ether skeleton) and a side-chain component (2-naphthoyl group) of the cellulose derivative to perpendicularly cross each other. This achieves additivity of birefringence in both of the components. A difference in wavelength dispersibility of in-plane retardations that are exhibited by the birefringence of respective components exhibits a reverse wavelength dispersibility.

Further, it is necessary to thermally stretch the base film at an optimum stretching ratio so as to cause the stretched film to have a positive birefringence and a positive in-plane retardation. Introduction of an excessive amount of side-chain components into the cellulose derivative changes the maximum birefringence direction of the stretched film. This unfavorably produces a stretched film having a negative birefringence, a negative in-plane retardation, and a normal wavelength dispersibility (the stretched film will contain a cellulose derivative having a negative birefringence). Such a stretched film cannot exhibit an intended property.

Next, the substitution degree $D_2$ will be discussed below.

In the present invention, 2-naphthoyl groups are introduced into the OH groups remaining in the cellulose ether skeleton having the alkoxyl group substitution degree $D_1$ that falls within the above-described range. In doing so, the 2-naphthoyl groups can be introduced into almost all of the remaining OH groups or into some of the remaining OH groups.

From the viewpoint of readily achieving an intended value of total substitution degree $D_3$, the substitution degree $D_2$ needs to be not less than 0.3 and not more than 1.0, preferably not less than 0.35 and not more than 0.70.

In a case where the polymeric material is composed of one type of cellulose derivative (in other words, in a case where a value of total substitution degree $D_3$ of the polymeric material is equal to that of substitution degree $D_2$ of the one type of cellulose derivative that constitute the polymeric material), the substitution degree $D_2$ can be not less than 0.40 and not more than 0.50. In order to achieve the optimum reverse wavelength dispersion property, the substitution degree $D_2$ is preferably not less than 0.41 and not more than 0.50, more preferably not less than 0.42 and not more than 0.50, still more preferably not less than 0.42 and not more than 0.48, still further more preferably not less than 0.44 and not more than 0.48, most preferably not less than 0.45 and not more than 0.47.

As described above, there are two different cases (i) where the polymeric material is composed of one type of cellulose derivative and (ii) where the polymeric material is composed of a combination of two or more types of cellulose derivatives.

In a case where the polymeric material is composed of one type of cellulose derivative, a value of total 2-naphthoyl group substitution degree $D_3$ of the polymeric material is equal to that of 2-naphthoyl group substitution degree $D_2$ of the one type of cellulose derivative. Meanwhile, in a case where the polymeric material is composed of a combination of two or more types of cellulose derivatives, a value of the total 2-naphthoyl group substitution degree $D_3$ of the polymeric material can be calculated based on values of 2-naphthoyl group substitution degrees $D_2$ of the two or more types of cellulose derivatives. The following description will discuss this point.

A value of an optimum total substitution degree $D_3$ of two or more types of cellulose derivatives has been proven (see Examples below). An optimum total substitution degree $D_3$ of one type of cellulose derivative can also be calculated by the calculation simulation method, which will be described below. Further, in doing so, it is possible to calculate, based on a value of the obtained optimum total substitution degree $D_3$, an in-plane retardation and a wavelength dispersion property.

Specifically, first, an in-plane retardation and a wavelength dispersion property of a cellulose derivative (for example, cellulose derivatives 1 and 2 of Reference Examples TI and 4, and of Examples 2, 3, and 5 through 7 each discussed in [Examples]) are experimentally measured. Then, an in-plane retardation and a wavelength dispersion property, which have also been experimentally measured, of only a main-chain component (cellulose ether skeleton) contained in the cellulose derivative are deducted from the in-plane retardation and the wavelength dispersion property of the cellulose derivative, respectively, so as to calculate an in-plane retardation and a wavelength dispersion property of a side-chain component (2-naphthoyl group) contained in the cellulose derivative. That is, in doing so, it is possible to create a database which includes (i) pieces of data on in-plane retardations and wavelength dispersion properties of the main-chain components (cellulose ether skeletons) with different structures and (ii) pieces of data on in-plane retardations and wavelength dispersion properties of side-chain components (2-naphthoyl groups) with different structures.

Because of the foregoing additivity, each data of an in-plane retardation and a wavelength dispersion property of an intended cellulose derivative can be calculated by adding, of the above-described database, (i) pieces of data on an in-plane retardation and a wavelength dispersion property of a main-chain component (cellulose ether skeleton) of the intended cellulose derivative to pieces of data on an in-plane retardation and a wavelength dispersion property of a side-chain component (2-naphthoyl group) the intended cellulose derivative.

According to the above-described calculation simulation method, the total substitution degree $D_3$ is most preferably 0.46 for achieving the effect of the present invention.

In order to produce one type of cellulose derivative having the total substitution degree $D_3$ of 0.46 (see, for example, Hypothetical Example 8, which will be described later), it is the simplest and ideal method that cellulose ether having substitution degree $D_1$ of 2.54 is treated so that OH groups remaining in the cellulose ether are completely substituted by 2-naphthoyl groups. However, this method is not practicable since it is difficult to obtain or synthesize such cellulose ether.

It is also in theory possible to produce, with use of cellulose ether having a low alkoxyl substitution degree (e.g., cellulose ether ($D_1$=2.37) of Synthesis Example 2, which will be described later), one type of cellulose derivative having the total substitution degree $D_3$ of 0.46. This method, however, requires stopping a reaction of forming a 2-naphthoyl in progress, and thus decreases reproducibility as a synthesis method. Further, this method causes residual OH groups in the cellulose derivative and results in increase in water absorption rate of a film. This may give rise to an undesired problem for an optical film for use in electronic devices. Therefore, this method is not practicable.

From the above reasons, in a case where it is difficult to achieve the optimum total substitution degree $D_3$ with use of one type of cellulose derivative, the optimum total substitution degree $D_3$ can be achieved with use of two or more types of cellulose derivatives. For example, by mixing a cellulose derivative ($D_1$=2.60, $D_2$=0.40) described in Synthesis Example 1 with a cellulose derivative ($D_1$=2.37, $D_2$=0.62) described in Synthesis Example 2 at a proper compounding ratio (at a weight ratio, more preferably at a molar ratio), it is possible to adjust the total substitution degree $D_3$ to 0.46. This makes it possible to achieve the optimal reverse wavelength dispersibility.

In this method, it is difficult to achieve an optimum effect when the above-described two types of cellulose derivatives are used singly. However, the above method uses the two types of cellulose derivatives (i) which have identical skeletons and thus have high compatibility to each other and (ii) which are substantially completely aromatically acylated, and thus facilitates synthesis of these cellulose derivatives and reproduction of a film property. In addition, the above method is preferable in terms of film property because few OH groups remain in a film.

As described earlier, the total substitution degree $D_3$ represents a total substitution degree of aromatic acyl groups of the cellulose derivative which constitutes the present invention. In a case where one type of cellulose derivative constitutes the present invention, a substitution degree $D_2$ of the one type of cellulose derivative equals in value to the total substitution degree $D_3$ of the aromatic acyl groups ($D_2$=$D_3$). In contrast, in a case where a combination of two or more types of cellulose derivatives constitute the present invention, the total substitution degree $D_3$ of aromatic acyl groups equals to a sum of respective substitution degrees $D_2$ of the two or more types of cellulose derivatives.

A value of the total substitution degree $D_3$ can be measured with use of the aforementioned nuclear magnetic resonance spectroscopic method (NMR).

(D) In-Plane Retardation: $Re(\lambda)$ $Re(\lambda)$ denotes an in-plane retardation of $\lambda$ nm and is defined by the following equation (1):

$$Re(\lambda)=\Delta Nxy(\lambda) \times d \quad (1)$$

where $\Delta Nxy(\lambda)$ denotes a birefringence of $\lambda$ nm, and d denotes a film thickness, wherein the birefringence refers to a difference between the maximum refractive index and the minimum refractive index within a film plane.

In a case where the phase difference film of the present invention is used as a film antireflection layer, the phase difference film preferably has an in-plane retardation of approximately one-fourth of a measurement wavelength. Particularly, a retardation Re(550) of 550 nm is not less than 130 nm and not more than 160 nm, preferably not less than 130 nm and not more than 150 nm.

In a case where the phase difference film of the present invention is used as an antireflection layer, a reverse wavelength dispersion property Re(450)/Re(550) of the phase difference film can be not less than 0.80 and not more than 0.86 or (ii) not less than 0.80 and not more than 0.89. An in-plane retardation and a wavelength dispersion property that do not fall within this range are not preferable because they result in insufficient anti-reflection in a certain wavelength range.

(E) Film Thickness

The phase difference film of the present invention has a thickness of not less than 20 μm and not more than 50 μm, preferably not less than 20 μm and not more than 40 μm, from the viewpoint of a thickness of a whole antireflection layer when the phase difference film of the present invention is used as the antireflection layer.

The phase difference film can have a further smaller thickness, provided that an intended in-plane retardation and an intended reverse wavelength dispersion property are met. However, it is necessary to reflect that a phase difference film having an excessively small thickness faces problems of film strength and ease of handing. In contrast, production of a film having a great film thickness by the solvent-casting method requires a longer time for drying the solvent, and thus decreases productivity.

(F) Haze

A haze of the phase difference film (e.g., stretched film) of the present invention is not particularly limited in value. Note, however, that the haze has a value of preferably not more than 2.00%, more preferably not more than 1.00%, most preferably not more than 0.50%. A haze value falling within the above range is preferable because it increases overall light transmittance of the stretched film, and thus improves transparency of the stretched film.

(G) Third Component

The phase difference film of the present invention can optionally contain, as a third component, a small amount of additive such as a plasticizer, a thermal stabilizer, and/or an ultraviolet light absorber. Such a third component can be added during a film formation step. Particularly in a case where a resultant phase difference film is brittle, it is effective to add a plasticizer so as to improve processability, such as stretching processability. The third component can be added in any amount within the bounds of not sacrificing an intended optical property.

(H) Molar Weight of Cellulose Derivative

A molar weight of a resin (cellulose derivative) to be used in the present invention is not particularly limited, provided that the resin is formable in a film form. For example, in order to produce a film having an excellent toughness, it is preferable to use a resin whose number average molar weight is not less than 10,000 and not more than 300,000. In a case where a resin made from a natural resin is used, it is more preferable to use a resin whose number average molar weight is not less than 20,000 and not more than 200,000 because such a resin is widely available in the market. A resin having an excessively small molar weight causes the film to be brittle. On the other hand, a resin having an excessively large molar weight cannot be dissolved in a solvent well. This causes a decrease in solid content concentration of a resin solution, and thus causes an increase in amount of a solution to be used during a solution-casing step. Therefore, those two resins are not preferable from the viewpoint of producing of the film.

(I) Film-Forming Method

The phase difference film of the present invention is preferably produced by stretching a base film which has not been stretched (also referred to as an unstretched film). The base film, which has not been stretched, can be produced by a conventional method.

A typical method for forming the unstretched film encompasses the melt-extrusion method, in which a molten resin is extruded from a T die or the like so as to form a film, and the solvent-casting method, in which an organic solution in which a resin has been dissolved is cast onto a support and the organic solution thus cast is dried by heating so as to form a film. It is preferable to employ the solvent-casting method because the solvent-casting method makes it possible to comparatively easily produce a phase difference film whose thickness is highly precise.

A solvent to be used in the solvent-casting method is not particularly limited. From the viewpoint of a drying efficiency, a solvent having a lower boiling point is preferable. Specifically, a solvent having a boiling point as low as 100° C. or lower is preferable. More specifically, a ketone-based solvent and an ester-based solvent can be used. Further, a halogenated hydrocarbon solvent such as methylene chloride is suitable because it easily dissolves a resin material and has a low boiling point. The methylene chloride, which has a low boiling point of 40° C. and which exerts a high degree of safety against, for example, fire that may occur during a drying step, is particularly preferable as a solvent to be used for producing the phase difference film of the present invention.

The solvent to be used in the present invention is preferably composed solely of methylene chloride from the viewpoint of collection easiness and reusability. However, it is also possible to use a mixture solvent containing 70 wt % to 99 wt % of methylene chloride and 1 wt % to 30 wt % of alcohol having three or fewer carbon atoms.

In a case where the mixture solvent is used, it is preferable to use ethyl alcohol as the alcohol having three or fewer carbon atoms because the ethyl alcohol is safe and has a low boiling point. Further, in order to reduce a production cost, it is preferable that the mixture solvent contain, out of 100 parts by weight of the alcohol having three or fewer carbon atoms, 1 part by weight to 10 parts by weight of alcohol which is other than ethyl alcohol and has three or fewer carbon atoms. As the alcohol other than ethyl alcohol having three or fewer carbon atoms, it is particularly preferable to use isopropyl alcohol from the viewpoint of safety and a boiling point. The solvent mentioned herein refers to a solvent having a boiling point lower than a maximum temperature of a film during the drying step and the stretching step.

(J) Stretching Ratio

In order to obtain the phase difference film of the present invention, it is preferable to subject the unstretched film obtained as described above to an orientation treatment of at least uniaxially stretching the unstretched film in accordance with a known stretching method. The stretching method can be a uniaxial or biaxial heat stretching method. In order to obtain the phase difference film of the present invention, it is preferable to employ a vertical uniaxial stretching technique. Further, in a case where the phase difference film of the present invention is to be used as an antireflection layer, a free-end uniaxial stretching technique is preferable because it is important that the phase difference film has a property of being uniaxial.

The stretching ratio X is expressed by the following equation (2):

$$X = (L - L0)/L0 \times 100 \tag{2}$$

where L0 denotes a length of the unstretched film, and L denotes a length of the stretched film.

The stretching ratio to be used in production of the phase difference film of the present invention is preferably not less than 20% and not more than 200%, more preferably not less than 20% and not more than 150%, still more preferably not less than 20% and not more than 100%, still further more preferably not less than 30% and not more than 100%.

A stretching ratio of more than 200% is not preferable because it (i) causes an in-plane retardation of the stretched film to be excessively greater than a target numerical range and (ii) causes a poor orientation of the polymeric material. This leads to a significant decrease in strength in a perpendicular direction (TD direction) with respect to a stretching direction. Further, an increase in stretching ratio causes a decrease in film thickness. As shown in the above equation (1), the in-plane retardation is proportional to the film thickness d. Thus, an extremely high stretching ratio may result in a failure to achieve the intended in-plane retardation.

On the other hand, a stretching ratio of less than 20% causes the stretched film to have a small birefringence, and thus causes an increase in film thickness of a film that has the intended in-plane retardation.

In a case where the alkoxyl group, which is a substituent of the cellulose derivative, is an ethyl group, the stretching ratio to be used in production of the phase difference film of the present invention is preferably not less than 20% and not more than 60%, more preferably not less than 30% and not more than 50%. With this arrangement, in a case where the alkoxyl group, which is the substituent of the cellulose derivative, is an ethyl group, it is possible to suitably achieve the intended in-plane retardation while preventing the film from breaking.

(K) Stretching Temperature

A stretching temperature is preferably selected to fall within a range from (Tg−30)° C. to (Tg+30)° C. with respect to a glass transition temperature Tg of the film. The stretching temperature particularly preferably falls within a range from (Tg−10)° C. to (Tg+30)° C.

More specifically, the stretching temperature is preferably not lower than 140° C. and not higher than 170° C., more preferably not lower than 150° C. and not higher than 160° C.

A stretching temperature which falls within the above temperature range allows preventing opacity of the film during the stretching and producing a phase difference film that has less variations in phase difference, and compatibly achieves the optimum reverse wavelength dispersibility, the optimum in-plane retardation, and the optimum haze value (specifically, a low haze value).

(L) Substrate Material Used in Solvent-Casting Method

According to the solvent-casting method of forming a film, a resin is dissolved in the aforementioned solvent, the solution is cast onto a support, and the solvent is removed by drying to form a film.

A viscosity of the solvent in which the resin has been dissolved is preferably not less than 10 poise and not more than 50 poise, more preferably not less than 15 poise and not more than 50 poise. A preferred support encompasses a stainless steel endless belt, a film such as a polyimide film, a biaxially stretched polyethylene terephthalate film, and the like.

After the casting, drying can be carried out in a state in which the film is held by the support. In contrast, the film cast on the support can alternatively be pre-dried until the film has a self-supporting property, followed by removal of the film from the support and further drying of the removed film, as appropriate.

Generally, the drying can be carried out by a floating method, a tenter method, or a roller conveyance method. The floating method causes the film itself to receive a complex stress. Thus, uneven optical property of the film is likely to occur. The tenter method requires adjusting a distance between pins or clips, which support respective ends of the film, so as to strike a balance between width shrinkage, which results from drying of a solvent, and tensile force for supporting the film's own weight. Thus, the tenter method requires a complicated control of width expansion and shrinkage.

In contrast, the roller conveyance method basically applies tension for stable conveyance of the film in a direction of flow of the film (in the MD direction). Thus, the roller conveyance method has an advantage of easily achieving uniformity of a direction in which stress is exerted. Thus, the roller conveyance method is the most preferable method for drying the film. Further, in order to obtain the phase difference film of the present invention which is excellent in mechanical strength and transparency, it is effective to dry the film in an atmosphere in which humidity is kept low so that the film will not absorb moisture during drying of the solvent.

(M) Circularly Polarizing Plate and Image Display Device

The phase difference film of the present invention can be used as an antireflection layer. Forms of the antireflection layer encompass a circularly polarizing plate containing the phase difference film of the present invention. Note that the circularly polarizing plate refers to an optical element that converts unpolarized light into circularly polarized light. Examples of arrangements of the circularly polarizing plate includes a laminate in which a polarizer and the phase difference film of the present invention are stacked so that an absorption axis of the polarizer and a slow phase axis of the phase difference film form an angle of 45 degrees. The laminate can include an adhesive layer and a polarizer protecting film. Constructions of the adhesive layer and the polarizer protecting film are not limited. The antireflection layer can be usefully employed in image display devices such as a liquid crystal display device and an organic EL display device. Further, the phase difference film of the present invention can also serve as the polarizer protecting film.

(N) Method for Producing Phase Difference Film

A method for producing the phase difference film in accordance with the present embodiment is a method for producing a phase difference film including a polymeric material composed of at least one type of cellulose derivative having a polymerization unit represented by general formula (1):

[Chem. 5]

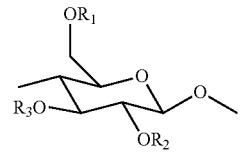

General formula (1)

where each of $R_1$, $R_2$, and $R_3$ independently contains an aliphatic group, an unsaturated aliphatic group, or a 2-naphthoyl group, the phase difference film having (a) an in-plane retardation Re(550) of not less than 130 nm and not more than 160 nm, (b) a reverse wavelength dispersion property Re(450)/Re(550) of not less than 0.80 and not more than 0.89, (c) a film thickness of not less than 20 μm and not more than 50 μm, and (d) a haze of not more than 2.00%, wherein: in the at least one type of cellulose derivative, a sum of substitution degrees $D_1$ of alkoxyl groups each containing an aliphatic group or an unsaturated aliphatic group is not less than 2.00 and not more than 2.60; in the at least one type of cellulose derivative, a substitution degree $D_2$ of each 2-naphthoyl group is not less than 0.40 and not more than 1.00; in the polymeric material, a total substitution degree $D_3$ of 2-naphthoyl groups is not less than 0.40 and not more than 0.50; and each of the substitution degrees $D_1$ and the substitution degree $D_2$ satisfy $D_1+D_2 \leq 3.0$.

This method includes the step of stretching, at a temperature falling within a range from 150° C. to 160° C., base film which contains the polymeric material.

In the step of stretching the base film, it is preferable that the base film including the polymeric material be stretched at a stretching ratio of not less than 30% and not more than 50%.

Details of the methods for producing the phase difference film in accordance with the present embodiment have been discussed in the above sections: "(I) Film-forming method", "(J) Stretching ratio", "(K) Stretching temperature", and "(L) Base material used in solvent-casting method", and thus are not discussed here.

The present invention can also be arranged as described below.

[1]

A phase difference film including a cellulose derivative represented by general formula (1):

[Chem. 6]

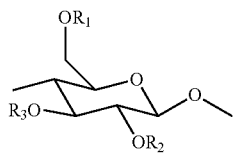

General formula (1)

where: each of $R_1$ and $R_2$ independently contains an aliphatic group, an unsaturated aliphatic group, or an aromatic hydrocarbon group; $R_3$ contains aromatic hydrocarbon, a sum of substitution degrees $D_1$ of alkoxyl groups containing $R_1$ and $R_2$ is 2.0 to 2.5; a substitution degree $D_2$ of aromatic ester containing $R_3$ is 0.5 to 1.0; $D_1+D_2 \leq 3.0$ is satisfied; and n represents an average polymerization degree, the phase difference film having (a) an in-plane retardation Re(550) of not less than 130 nm and not more than 160 nm, (b) a reverse wavelength dispersion property Re(450)/Re(550) of not less than 0.80 and not more than 0.92, and (c) a film thickness of not less than 30 μm and not more than 50 μm.

[2]
The phase difference film described in [1], wherein in the cellulose derivative, each of $R_1$ and $R_2$ in the general formula (1) has an aliphatic alkyl group.

[3]
The phase difference film described in [2], wherein in the cellulose derivative, $R_3$ in the general formula (1) has an aromatic ester group containing polycyclic aromatic hydrocarbon.

[4]
The phase difference film described in [3], wherein in the cellulose derivative, each of $R_1$ and $R_2$ in the general formula (1) has an ethyl group.

[5]
The phase difference film described in [4], wherein in the cellulose derivative, $R_3$ in the general formula (1) has a 2-naphthoyl group.

[6]
The phase difference film described in any one of [1] through [5], wherein the phase difference film is obtained by stretching, at a stretching ratio of not less than 30% and not more than 200%, a base film including the polymeric material.

[7]
The phase difference film described in [6], wherein the base film is stretched at a temperature falling within a range from (Tg−10)° C. to (Tg+30)° C. with respect to a glass transition temperature Tg of the base film.

[8]
A circularly polarizing plate including at least one phase difference film described in any one of [1] through [7].

[9]
An image display device including the circularly polarizing plate described in [8].

EXAMPLES

The following description will discuss Examples of the present invention, but the present invention is not limited thereto.

<1. Measurement Method>

Values of properties described herein were obtained by the following evaluation methods.

(1) In-Plane Retardation and Reverse Wavelength Dispersion Property

An in-plane retardation and a reverse wavelength dispersion property were measured with use of OPTIPRO manufactured by SHINTEC, Inc.

(2) Thickness

A thickness was measured with use of an electronic micrometer manufactured by ANRITSU Corp.

(3) Glass Transition Temperature (Tg)

A glass transition temperature was measured with use of a thermomechanical analysis apparatus TMA-4000SA manufactured by Bruker AXS K.K. Specifically, a cut film piece of 5 mm×20 mm was heated at a rate of 3° C./min under a nitrogen atmosphere with a tensile load of 3 g applied thereto. From an obtained actual measurement graph (an actual measurement graph on which data of temperatures was plotted in an X axis direction and data of elongation measurement values was plotted in a Y axis direction), an intersection point of two tangent lines at points before and after elongation of the film begins was defined as Tg, and Tg was thus calculated.

(4) Haze

A haze was measured with use of a haze meter NDH-300A manufactured by NIPPON DENSHOKU INDUSTRIES CO., LTD.

<2. Cellulose Derivatives>

The following description will discuss specific methods for synthesizing cellulose derivatives.

(Synthesis Example 1) (Cellulose Derivative 1; Synthesis of Ethyl Cellulose-2-Naphthoate; $D_1=2.60$, $D_2=0.40$)

As cellulose ether, ethyl cellulose (11.74 g: 50 mmol, $D_1=2.60$) was dispensed into a four-neck reactor. Subsequently, a magnetic stirrer was put into the four-neck reactor, and a dimroth condenser, a dropping funnel, a thermocouple, and a nitrogen-introduced balloon were then attached to the four-neck reactor. Thereafter, the four-neck reactor was purged with nitrogen.

After pyridine (201 ml: 2500 mmol) was placed into the reactor, the mixture was stirred with use of the magnetic stirrer at 2000 rpm while being heated at a temperature of 80° C., until the ethyl cellulose completely dissolved.

After it was confirmed that the solution became transparent, 2-naphthoyl chloride (manufactured by Wako Pure Chemical Industries, Ltd.) (47.7 g: 250 mmol) dissolved in 100 ml of 1,4-dioxane was dropped into the solution. The mixture was then stirred for 8 hours. The reaction solution was dropped into 500 ml of methanol and then stirred to prepare a homogeneous solution. The homogeneous solution was dropped into a liter of pure water and stirred to obtain a white precipitate. After filtering, the white precipitate was then stirred with a liter of pure water again for washing.

Subsequently, the step of washing the white precipitate with 500 ml of methanol and the step of subjecting the white precipitate to filtering were each carried out twice. Thereafter, the white precipitate was subjected to vacuum drying for 5 hours at 60° C. with use of a vacuum oven. As a result, an intended powdery cellulose derivative (molar yield: 87%, 12.87 g) was obtained.

The resin thus obtained was analyzed with use of 400 MHz $^1$H-NMR manufactured by Bruker to confirm that the resin was an intended cellulose derivative. In addition, calculation of the substitution degree was carried out. The naphthoyl substitution degree $D_2$ was 0.40.

(Synthesis Example 2) (Cellulose Derivative 2; Synthesis of Ethyl Cellulose-2-Naphthoate; $D_1$=2.37, $D_2$=0.62)

In Synthesis Example 2, an intended powdery cellulose derivative (molar yield: 93%, 15.11 g) was obtained in a manner similar to Synthesis Example 1 except that ethyl cellulose (11.42 g: 50 mmol, $D_1$=2.37) was used as the cellulose ether.

The resin thus obtained was analyzed with use of 400 MHz-$^1$H-NMR manufactured by Bruker to confirm that the resin was an intended cellulose derivative. In addition, calculation of the substitution degree was carried out. The naphthoyl substitution degree $D_2$ was 0.62.

(Hypothetical Synthesis Example 3) (Cellulose Derivative 2; Synthesis of Ethyl Cellulose-2-Naphthoate; $D_1$=2.37, $D_2$=0.46)

An intended powdery cellulose derivative (hypothetical molar yield: 85%, 12.74 g) is obtained with use of ethyl cellulose (11.42 g: 50 mmol, $D_1$=2.37) as the cellulose ether in a manner similar to Synthesis Example 2.

The obtained resin is analyzed by 400 MHz-$^1$H-NMR manufactured by Bruker to confirm that the resin is the intended cellulose derivative. As a result of calculation of the substitution degree, the naphthoyl substitution degree $D_2$ is 0.46.

Note that the naphthoyl substitution degree $D_2$ and the like can be calculated by, for example, the calculation simulation method based on the additivity of birefringence (see, for example, EKISHO, Vol. 9, No. 4, (2005), pp. 227-236).

(Synthesis Example 4) (Cellulose Derivative 2; Synthesis of Ethyl Cellulose-2-Naphthoate; $D_1$=2.37, $D_2$=0.53)

In Synthesis Example 4, an intended powdery cellulose derivative (molar yield: 95%, 14.69 g) was obtained in a manner similar to Synthesis Example 2 in which ethyl cellulose (11.42 g: 50 mmol, $D_1$=2.37) was used as the cellulose ether.

This resin was analyzed with use of 400 MHz-$^1$H-NMR manufactured by Bruker to confirm that the resin was an intended cellulose derivative. In addition, calculation of the substitution degree was carried out. The naphthoyl substitution degree $D_2$ was 0.53.

(Synthesis Example 5 (Cellulose Derivative 1; Synthesis of Ethyl Cellulose-2-Naphthoate; $D_1$=2.60, $D_2$=0.34)

In Synthesis Example 5, an intended powdery cellulose derivative (molar yield: 82%, 11.75 g) was obtained in a manner similar to Synthesis Example 1 except that 2-naphthoyl chloride (19.06 g: 100 mmol) was used as an aromatic acylating agent.

This resin was analyzed with use of 400 MHz-$^1$H-NMR manufactured by Bruker to confirm that the resin was an intended cellulose derivative. In addition, calculation of the substitution degree was carried out. The naphthoyl substitution degree $D_2$ was 0.34.

(Synthesis Example 6) (Cellulose Derivative 1; Synthesis of Ethyl Cellulose-2-Naphthoate; $D_1$=2.60, $D_2$=0.32)

In Synthesis Example 6, an intended powdery cellulose derivative (molar yield: 82%, 11.72 g) was obtained in a manner similar to Synthesis Example 1 except that 2-naphthoyl chloride (19.06 g: 100 mmol) was used as the aromatic acylating agent.

This resin was analyzed with use of 400 MHz-$^1$H-NMR manufactured by Bruker to confirm that the resin was an intended cellulose derivative. In addition, calculation of the substitution degree was carried out. The naphthoyl substitution degree $D_2$ was 0.32.

(Synthesis Example 7) (Cellulose Derivative 1; Synthesis of Ethyl Cellulose-1-Naphthoate; $D_1$=2.60; $D_2$=0.40)

In Synthesis Example 7, an intended powdery cellulose derivative (molar yield: 93%, 13.76 g) was obtained in a manner similar to Synthesis Example 1 except that 1-naphthoyl chloride (47.7 g: 250 mmol) was used as the aromatic acylating agent.

This resin was analyzed with use of 400 MHz-$^1$H-NMR manufactured by Bruker to confirm that the resin was an intended cellulose derivative. In addition, calculation of the substitution degree was carried out. The naphthoyl substitution degree $D_2$ was 0.40.

(Synthesis Example 8) (Cellulose Derivative 1; Synthesis of Ethyl Cellulose Benzoate; $D_1$=2.60, $D_2$=0.40)

In Synthesis Example 8, an intended powdery cellulose derivative (molar yield: 84%, 11.48 g) was obtained in a manner similar to Synthesis Example 1 except that benzoyl chloride (35.2 g: 250 mmol) was used as the aromatic acylating agent.

This resin was analyzed with use of 400 MHz-$^1$H-NMR manufactured by Bruker to confirm that the resin was an intended cellulose derivative. In addition, calculation of the substitution degree was carried out. A benzoyl substitution degree $D_2$ was 0.40.

(Synthesis Example 9) (Cellulose Derivative 1; Synthesis of Ethyl Cellulose-4-Fluorobenzoate; $D_1$=2.60, $D_2$=0.40)

In Synthesis Example 9, an intended powdery cellulose derivative (molar yield: 83%, 11.81 g) was obtained in a manner similar to Synthesis Example 1 except that 4-fluorobenzoyl chloride (39.6 g: 250 mmol) was used as the aromatic acylating agent.

This resin was analyzed with use of 400 MHz-$^1$H-NMR manufactured by Bruker to confirm that the resin was an intended cellulose derivative. In addition, calculation of the substitution degree was carried out. A 4-fluorobenzoyl naphthoyl substitution degree $D_2$ was 0.40.

(Synthesis Example 10) (Cellulose Derivative 1; Synthesis of Ethyl Cellulose-4-Nitrobenzoate; $D_1$=2.60, $D_2$=0.40)

In Synthesis Example 10, an intended powdery cellulose derivative (molar yield: 89%, 13.10 g) was obtained in a manner similar to Synthesis Example 1 except that 4-nitrobenzoyl chloride (46.4 g: 250 mmol) was used as the aromatic acylating agent.

This resin was analyzed with use of 400 MHz-$^1$H-NMR manufactured by Bruker to confirm that the resin was an intended cellulose derivative. In addition, calculation of the substitution degree was carried out. A 4-nitrobenzoyl substitution degree $D_2$ was 0.40.

(Synthesis Example 11) (Cellulose Derivative Synthesis of Ethyl Cellulose-4-Phenyl Benzoate; $D_1$=2.60, $D_2$=0.34)

In Synthesis Example 11, an intended powdery cellulose derivative (molar yield: 79%, 11.70 g) was obtained in a manner similar to Synthesis Example 1 except that 4-phenyl benzoyl chloride (54.01 g: 250 mmol) was used as the aromatic acylating agent.

This resin was analyzed with use of 400 MHz-$^1$H-NMR manufactured by Bruker to confirm that the resin was an intended cellulose derivative. In addition, calculation of the substitution degree was carried out. A 4-phenyl benzoyl substitution degree $D_2$ was 0.34.

<3. Base Films>

The following description will discuss methods for producing base films with use of the above-described cellulose derivatives.

(Base Film Example 1) (Production of Film 1; $D_3$=0.40)

The resin prepared in Synthesis Example 1 was dissolved in a super-dehydrated product of methylene chloride (manufactured by Wako Pure Chemical Industries, Ltd.) to obtain a 1 wt % dilute solution. The dilute solution was subjected to vacuum filtration using hardened filter paper No. 4 (manufactured by Advantec Co., Ltd) to remove insoluble substances from the dilute solution. Thereafter, the filtrate thus obtained was concentrated with use of an evaporator to obtain a 4.1 wt % coating solution.

The coating solution was flow-cast onto a biaxially-stretched polyethylene terephthalate film (hereinafter, referred to as a PET film), and evenly spread in a film form with use of a bar coater so that a resultant film obtained after drying had a thickness of 40 μm to 50 μm.

The coating solution was dried for 5 minutes under a dry air atmosphere at 80° C., for 5 minutes under a dry air atmosphere at 100° C., and for 10 minutes under a dry air atmosphere at 120° C. to remove methylene chloride therefrom. Thereafter, the film thus obtained was separated from the PET film. The obtained film was fixed using an aluminum frame having a size of 500 mm×300 mm and then dried for 15 minutes under a dry air atmosphere at 110° C. to remove residual methylene chloride. As a result, a film 1 was obtained. A measured glass transition temperature of the film 1 was 145° C.

(Base Film Example 2) (Production of Film 2; $D_3$=0.42)

A film 2 was produced in a manner similar to Base film Example 1 except that a resin ($D_3$=0.42) which was prepared by mixing, at a weight ratio of 9:1, (i) the resin ($D_2$=0.40) produced in Synthesis Example 1 and (ii) the resin ($D_2$=0.62) produced in Synthesis Example 2 was used. A measured glass transition temperature of the film 2 was 145° C.

(Base Film Example 3) (Production of Film 3; $D_3$=0.44)

A film 3 was produced in a manner similar to Base film Example 1 except that a resin ($D_3$=0.44) which was prepared by mixing, at a weight ratio of 8:2, (i) the resin ($D_2$=0.40) produced in Synthesis Example 1 and (ii) the resin ($D_2$=0.62) produced in Synthesis Example 2 was used. A measured glass transition temperature of the film 3 was 145° C.

(Base Film Example 4) (Production of Film 4; $D_3$=0.46)

A film 4 was produced in a manner similar to Base film Example 1 except that a resin ($D_3$=0.46) which was prepared by mixing, at a weight ratio of 7:3, (i) the resin ($D_2$=0.40) produced in Synthesis Example 1 and (ii) the resin ($D_2$=0.62) produced in Synthesis Example 2 was used. A measured glass transition temperature of the film 4 was 145° C.

(Hypothetical Base Film Example 5) )Production of Film 5; $D_3$=0.46)

A film 5 is produced in a manner similar to Base film Example 1 except that the resin produced in Hypothetical Synthesis Example 3 is used. A glass transition temperature of the film 5 is 145° C.

(Base Film Example 6) (Production of Film 6; $D_3$=0.53)

A film 6 was produced in a manner similar to Base film Example 1 except that the resin produced in Synthesis Example 4 was used. A measured glass transition temperature of the film 6 was 145° C.

(Base Film Example 7) (Production of Film 7; $D_3$=0.34)

A film 7 was produced in a manner similar to Base film Example 1 except that the resin produced in Synthesis Example 5 was used. A measured glass transition temperature of the film 7 was 145° C.

(Base Film Example 8) (Production of Film 8; $D_3$=0.32)

A film 8 was produced in a manner similar to Base film Example 1 except that the resin produced in Synthesis Example 6 was used. A measured glass transition temperature of the film 8 was 145° C.

(Base Film Example 9) (Production of Film 9; $D_3$=0.40)

A film 9 was produced in a manner similar to Base film Example 1 except that the resin produced in Synthesis Example 7 was used. A measured glass transition temperature of the film 9 was 143° C.

(Base Film Example 10) (Production of Film 10; $D_3$=0.40)

A film 10 was produced in a manner similar to Base film Example 1 except that the resin produced in Synthesis Example 8 was used. A measured glass transition temperature of the film 10 was 145° C.

(Base Film Example 11) (Production of Film 11; $D_3=0.40$)

A film 11 was produced in a manner similar to Base film Example 1 except that the resin produced in Synthesis Example 9 was used. A measured glass transition temperature of the film 11 was 145° C.

(Base Film Example 12) (Production of Film 12; $D_3=0.40$)

A film 12 was produced in a manner similar to Base film Example 1 except that the resin produced in Synthesis Example 10 was used. A glass transition temperature Tg of the film 12 were not clearly measured.

(Base Film Example 13) (Production of Film 13; $D_3=0.34$)

A film 13 was produced in a manner similar to Base film Example 1 except that the resin produced in Synthesis Example 11 was used. A measured glass transition temperature of the film 13 was 150° C.

<4. Stretched Film>

The following description will discuss methods for producing stretched films with use of the above-described base films.

Reference Example 1

The film 1 was subjected to free-end uniaxial stretching at a stretching ratio of 30% at a temperature of 145° C. A film piece of 50 mm×40 mm was cut out from a center part of the stretched film thus obtained and then used for measurement. Table 1 shows results of the measurement.

Example 2

The film 1 was subjected to free-end uniaxial stretching at a stretching ratio of 40% at a temperature of 155° C. A film piece of 50 mm×40 mm was cut out from a center part of the stretched film thus obtained and then used for measurement. Table 1 shows a result of the measurement.

Example 3

The film 1 was subjected to free-end uniaxial stretching at a stretching ratio of 50% at a temperature of 155° C. A film piece of 50 mm×40 mm was cut out from a center part of the stretched film thus obtained and then used for measurement. Table 1 shows a result of the measurement.

Reference Example 4

The film 1 was subjected to free-end uniaxial stretching at a stretching ratio of 40% at a temperature of 165° C. A film piece of 50 mm×40 mm was cut out from a center part of the stretched film thus obtained and then used for measurement. Table 1 shows a result of the measurement.

Example 5

The film 2 was subjected to free-end uniaxial stretching at a stretching ratio of 50% at a temperature of 155° C. A film piece of 50 mm×40 mm was cut out from a center part of the stretched film thus obtained and then used for measurement. Table 1 shows a result of the measurement.

Example 6

The film 3 was subjected to free-end uniaxial stretching at a stretching ratio of 50% at a temperature of 155° C. A film piece of 50 mm×40 mm was cut out from a center part of the stretched film thus obtained and then used for measurement. Table 1 shows a result of the measurement.

Example 7

The film 4 was subjected to free-end uniaxial stretching at a stretching ratio of 50% at a temperature of 155° C. A film piece of 50 mm×40 mm was cut out from a center part of the stretched film thus obtained and then used for measurement. Table 1 shows a result of the measurement.

Hypothetical Example 8

It is assumed that the film 5 is subjected to free-end uniaxial stretching at a stretching ratio of 50% at a temperature of 155° C., and a film piece of 50 mm×40 mm is cut out from a center part of the stretched film thus obtained and then used for measurement. Table 1 shows a result of the measurement.

Note that each parameter of the stretched films can be calculated by, for example, the calculation simulation method based on the additivity of birefringence (see, for example, EKISHO, Vol. 9, No. 4, (2005), pp. 227-236).

Comparative Example 1

The film 6 was subjected to free-end uniaxial stretching at a stretching ratio of 50% at a temperature of 155° C. A film piece of 50 mm×40 mm was cut out from a center part of the stretched film thus obtained and then used for measurement. Table 2 shows a result of the measurement.

Comparative Example 2

The film 7 was subjected to free-end uniaxial stretching at a stretching ratio of 30% at a temperature of 155° C. A film piece of 50 mm×40 mm was cut out from a center part of the stretched film thus obtained and then used for measurement. Table 2 shows a result of the measurement.

Comparative Example 3

The film 8 was subjected to free-end uniaxial stretching at a stretching ratio of 50% at a temperature of 155° C. A film piece of 50 mm×40 mm was cut out from a center part of the stretched film thus obtained and then used for measurement. Table 2 shows a result of the measurement.

Comparative Example 4

The film 9 was subjected to free-end uniaxial stretching at a stretching ratio of 50% at a temperature of 153° C. A film piece of 50 mm×40 mm was cut out from a center part of the stretched film thus obtained and then used for measurement. Table 2 shows a result of the measurement.

Comparative Example 5

The film 10 was subjected to free-end uniaxial stretching at a stretching ratio of 30% at a temperature of 155° C. A film piece of 50 mm×40 mm was cut out from a center part of the stretched film thus obtained and then used for measurement. Table 2 shows a result of the measurement.

Comparative Example 6

The film 11 was subjected to free-end uniaxial stretching at a stretching ratio of 40% at a temperature of 155° C. A film piece of 50 mm×40 mm was cut out from a center part of the stretched film thus obtained and then used for measurement. Table 2 shows a result of the measurement.

Comparative Example 7

The film 12 was subjected to free-end uniaxial stretching at a stretching ratio of 40% at a temperature of 165° C. A film piece of 50 mm×40 mm was cut out from a center part of the stretched film thus obtained and then used for measurement. Table 2 shows a result of the measurement.

Comparative Example 8

The film 13 was subjected to free-end uniaxial stretching at a stretching ratio of 50% at a temperature of 160° C. A film piece of 50 mm×40 mm was cut out from a center part of the stretched film thus obtained and then used for measurement. Table 2 shows a result of the measurement.

TABLE 1

|  |  | Reference Example 1 | Example 2 | Example 3 | Reference Example 4 | Example 5 | Example 6 | Example 7 | Hypothetical Example 8 |
|---|---|---|---|---|---|---|---|---|---|
| Cellulose derivative 1 | Alkoxyl group | EtO | EtO | EtO | EtO | EtO | EtO | EtO | — |
|  | Aromatic acyl group | 2-naphthoyl | 2-naphthoyl | 2-naphthoyl | 2-naphthoyl | 2-naphthoyl | 2-naphthoyl | 2-naphthoyl | — |
|  | $D_1$ | 2.60 | 2.60 | 2.60 | 2.60 | 2.60 | 2.60 | 2.60 | — |
|  | $D_2$ | 0.40 | 0.40 | 0.40 | 0.40 | 0.40 | 0.40 | 0.40 | — |
|  | $D_1 + D_2$ | 3.00 | 3.00 | 3.00 | 3.00 | 3.00 | 3.00 | 3.00 | — |
| Cellulose derivative 2 | Alkoxyl group | — | — | — | — | EtO | EtO | EtO | EtO |
|  | Aromatic acyl group | — | — | — | — | 2-naphthoyl | 2-naphthoyl | 2-naphthoyl | 2-naphthoyl |
|  | $D_1$ | — | — | — | — | 2.37 | 2.37 | 2.37 | 2.37 |
|  | $D_2$ | — | — | — | — | 0.62 | 0.62 | 0.62 | 0.46 |
|  | $D_1 + D_2$ | — | — | — | — | 2.99 | 2.99 | 2.99 | 2.83 |
| Total aromatic acyl group substitution degree $D_3$ |  | 0.40 | 0.40 | 0.40 | 0.40 | 0.42 | 0.44 | 0.46 | 0.46 |
| Cellulose derivative 1:Cellulose derivative 2 (weight ratio) |  | Derivative 1 only | Derivative 1 only | Derivative 1 only | Derivative 1 only | 9:1 | 8:2 | 7:3 | Derivative 2 only |
|  | Base film | Film 1 | Film 1 | Film 1 | Film 1 | Film 2 | Film 3 | Film 4 | Film 5 |
| Stretching conditions | Stretching ratio (%) | 30 | 40 | 50 | 40 | 50 | 50 | 50 | 50 |
|  | Temperature (° C.) | 145 | 155 | 155 | 165 | 155 | 155 | 155 | 155 |
| Stretched film | Thickness (μm) | 35 | 39 | 45 | 45 | 40 | 40 | 45 | 45 |
|  | Re(550) (nm) | 140 | 149 | 160 | 149 | 160 | 144 | 141 | 156 |
|  | Re(450)/Re(550) | 0.87 | 0.88 | 0.89 | 0.90 | 0.86 | 0.84 | 0.81 | 0.82 |
|  | Haze (%) | 6.88 | 1.92 | 1.95 | 0.86 | 2.12 | 2.41 | 1.87 | 1.53 |

TABLE 2

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Cellulose derivative 1 | Alkoxyl group | — | EtO | EtO | EtO | EtO | EtO | EtO | EtO |
|  | Aromatic acyl group | — | 2-naphthoyl | 2-naphthoyl | 1-naphthoyl | benzoyl | 4-fluorobenzoyl | 4-nitrobenzoyl | 4-phenylbenzoyl |
|  | $D_1$ | — | 2.60 | 2.60 | 2.60 | 2.60 | 2.60 | 2.60 | 2.60 |
|  | $D_2$ | — | 0.34 | 0.32 | 0.40 | 0.40 | 0.40 | 0.40 | 0.34 |
|  | $D_1 + D_2$ | — | 2.94 | 2.92 | 3.00 | 3.00 | 3.00 | 3.00 | 2.94 |
| Cellulose derivative 2 | Alkoxyl group | EtO | — | — | — | — | — | — | — |
|  | Aromatic acyl group | 2-naphthoyl | — | — | — | — | — | — | — |
|  | $D_1$ | 2.37 | — | — | — | — | — | — | — |
|  | $D_2$ | 0.53 | — | — | — | — | — | — | — |
|  | $D_1 + D_2$ | 2.90 | — | — | — | — | — | — | — |
| Total aromatic acyl group substitution degree $D_3$ |  | 0.53 | 0.34 | 0.32 | 0.40 | 0.40 | 0.40 | 0.40 | 0.34 |
| Cellulose derivative 1:Cellulose derivative 2 (weight ratio) |  | Derivative 2 only | Derivative 1 only | Derivative 1 only | Derivative 1 only | Derivative 1 only | Derivative 1 only | Derivative 1 only | Derivative 1 only |
|  | Base film | Film 6 | Film 7 | Film 8 | Film 9 | Film 10 | Film 11 | Film 12 | Film 13 |
| Stretching conditions | Stretching ratio (%) | 50 | 30 | 50 | 50 | 30 | 40 | 40 | 50 |
|  | Temperature (° C.) | 155 | 155 | 155 | 153 | 155 | 155 | 165 | 160 |
| Stretched film | Thickness (μm) | 49 | 35 | 43 | 36 | 35 | 20 | 25 | 38 |
|  | Re(550) (nm) | 30 | 161 | 160 | 293 | 132 | 169 | 224 | 241 |
|  | Re(450)/Re(550) | 0.40 | 0.91 | 0.92 | 1.01 | 0.95 | 0.97 | 1.10 | 1.01 |
|  | Haze (%) | 1.95 | 2.87 | 0.95 | 8.36 | 9.4 | 12.7 | 10.53 | 1.55 |

The present invention is not limited to the above-described embodiments, but can be altered by a skilled person in the art within the scope of the claims. An embodiment derived from a proper combination of technical means each disclosed in a different embodiment or example is also encompassed in the technical scope of the present invention. Further, it is possible to form a new technical feature by combining the technical means disclosed in the respective embodiments and examples.

INDUSTRIAL APPLICABILITY

The present invention is applicable to image display devices such as a liquid crystal display device and an organic EL display device.

The invention claimed is:

1. A phase difference film, comprising:
a polymeric material comprising a cellulose derivative having a polymerization unit of the formula (1):

$$\text{(structure with } OR_1, OR_2, R_3O \text{)} \tag{1}$$

wherein each of $R_1$, $R_2$, and $R_3$ independently contains an aliphatic group, an unsaturated aliphatic group, or a 2-naphthoyl group,
wherein
the phase difference film has an in-plane retardation Re(550) of from 130 nm to 160 nm, a reverse wavelength dispersion property Re(450)/Re(550) of from 0.80 to 0.86, and a film thickness of from 20 μm to 50 μm,
in the cellulose derivative, a sum of substitution degrees $D_1$ of alkoxyl groups each containing an aliphatic group or an unsaturated aliphatic group is from 2.00 to 2.70,
in the cellulose derivative, a substitution degree $D_2$ of 2-naphthoyl groups is from 0.30 to 1.00,
in the polymeric material, a total substitution degree $D_3$ of 2-naphthoyl groups is from 0.41 to 0.50, and
the substitution degrees $D_1$ and $D_2$ satisfy $D_1+D_2 \leq 3.0$.

2. The phase difference film of claim 1, wherein in the cellulose derivative, each of the alkoxyl groups in the formula (1) has an aliphatic alkyl group.

3. The phase difference film of claim 2, wherein in the cellulose derivative, each of the alkoxyl groups in the formula (1) has an ethyl group.

4. A method for producing the phase difference film of claim 1, comprising: stretching a base film including the polymeric material at a stretching ratio of from 20% to 200%, thereby forming the phase difference film.

5. The method of claim 4, wherein the stretching comprises stretching the base film at a temperature in a range of from (Tg−10° C.) to (Tg+30° C.) with respect to a glass transition temperature Tg of the base film.

6. A circularly polarizing plate, comprising:
at least one phase difference film of claim 1.

7. An image display device, comprising:
a circularly polarizing plate of claim 6.

8. The phase difference film of claim 1, wherein the cellulose derivative has a number average molar weight of from 10,000 to 300,000.

9. The phase difference film of claim 1, wherein the polymeric material comprises a plurality of cellulose derivatives including the cellulose derivative having the polymerization unit of the formula (1).

10. The phase difference film of claim 1, further comprising:
at least one additive selected from the group consisting of a plasticizer, a thermal stabilizer, and an ultraviolet light absorber.

11. The phase difference film of claim 1, wherein the phase difference film has a film thickness of from 20 μm to 40 μm.

12. A phase difference film, comprising:
a polymeric material comprising a cellulose derivative having a polymerization unit of the formula (1):

$$\text{(structure with } OR_1, OR_2, R_3O \text{)} \tag{1}$$

wherein each of $R_1$, $R_2$, and $R_3$ independently contains an ethyl group or a 2-naphthoyl group,
wherein
the phase difference film has an in-plane retardation Re(550) of from 130 nm to 160 nm, a reverse wavelength dispersion property Re(450)/Re(550) of from 0.80 to 0.89, a film thickness of from 20 μm to 50 μm, and a haze of not more than 2.00%,
in the cellulose derivative, a sum of substitution degrees $D_1$ of ethyl groups is from 2.00 to 2.70,
in the cellulose derivative, a substitution degree $D_2$ of 2-naphthoyl groups is from 0.30 to 1.00,
in the polymeric material, a total substitution degree $D_3$ of 2-naphthoyl groups is from 0.40 to 0.50, and
the substitution degrees $D_1$ and $D_2$ satisfy $D_1+D_2<3.0$.

13. The phase difference film of claim 12, wherein the phase difference film has a film thickness of from 20 μm to 40 μm.

14. A circularly polarizing plate, comprising:
at least one phase difference film of claim 12.

15. An image display device, comprising:
a circularly polarizing plate of claim 14.

16. A method for producing the phase difference film of claim 12, the method comprising: stretching a base film including the polymeric material at a temperature of from 150° C. to 160° C., thereby forming the phase difference film.

17. The method of claim 16, wherein the stretching comprises stretching the base film at a stretching ratio of from 20% to 60%.

18. The phase difference film of claim 12, wherein the polymeric material comprises a plurality of cellulose derivatives including the cellulose derivative having the polymerization unit of the formula (1).

19. The phase difference film of claim 12, further comprising:
at least one additive selected from the group consisting of a plasticizer, a thermal stabilizer, and an ultraviolet light absorber.

20. The phase difference film of claim 12, wherein the cellulose derivative has a number average molar weight of from 10,000 to 300,000.

* * * * *